UNITED STATES PATENT OFFICE.

MARZELL KROELL, OF ANCHORAGE, KENTUCKY.

COMPOSITION OF MATTER FOR SWEETENING AND PRESERVING.

SPECIFICATION forming part of Letters Patent No. 675,601, dated June 4, 1901.

Application filed January 16, 1901. Serial No. 43,553. (No specimens.)

*To all whom it may concern:*

Be it known that I, MARZELL KROELL, a citizen of the United States, residing at Anchorage, in the county of Jefferson and State of Kentucky, have invented a new and useful Composition of Matter to be Used for Sweetening Coffee, Tea, Dried Fruits, Oatmeal, and other Articles of Food and Keeping them Sweet, of which the following is a specification.

My composition consists of the following ingredients, combined in the proportions stated, viz: water, substantially pure, one-eighth of a pint; sugar, one-half of an ounce; garantose, three thirty-seconds of an ounce; baking-soda, one thirty-second of an ounce; sweet spirits of niter, four drops. These ingredients are to be mingled as follows: Put the sugar in the water and cook for five minutes over a hot fire. Take the garantose and baking-soda and mix them thoroughly and put the mixture into the sugar and water while the latter is hot. Then add the four drops of niter and shake the whole thoroughly.

In using the above-described composition it is applied to one pound of coffee or to the same quantity of tea, dried fruit, oatmeal, cracked wheat, or like suitable food material, which is put when hot and dry into a glass jar and the composition poured into the jar with it. The cover of the jar is then fastened and the jar put into a warm oven and kept in motion until the composition is soaked and dried into the food material. The contents of the jar when thoroughly dried in the oven are ready for market. Dried fruit so treated will keep for years without souring or becoming moldy. In preparing food treated with this composition for the table the same quantity may be used as of untreated food and no sugar need be applied.

No article to which this composition is applied will sour, and any to which it is applied is more wholesome and nourishing than food treated with sugar.

The cheapest of coffee and dried fruits treated with this composition are as agreeable to the taste and as nourishing as the finest of coffee and fruits to which sugar is applied after cooking.

What I claim, and desire to secure by Letters Patent of the United States, is—

1. The herein-described composition of matter, consisting of water, sugar, garantose, baking-soda and sweet spirits of niter, substantially as described and for the purpose specified.

2. The herein-described composition of matter for sweetening and protecting against souring or molding, coffee, tea, dried fruits, oatmeal, cracked wheat or like food material, consisting of water, substantially pure, one-eighth of a pint, sugar one-half ounce, garantose, three thirty-seconds of an ounce, baking-powder one thirty-second of an ounce; sweet spirits of niter four drops, substantially as described.

In testimony whereof I have signed my name to this specification in the presence of two witnesses.

MARZELL KROELL.

Witnesses:
    J. O'DONNELL,
    JNO. B. TILFORD.